United States Patent [19]

Thomas, Jr.

[11] 4,404,542
[45] Sep. 13, 1983

[54] DIGITAL SEQUENCE DETECTOR

[75] Inventor: Caleb H. Thomas, Jr., Pennsauken, N.J.

[73] Assignee: RCA Corporation, New York, N.Y.

[21] Appl. No.: 213,394

[22] Filed: Dec. 5, 1980

[51] Int. Cl.$^3$ .............................................. G06F 7/02
[52] U.S. Cl. ................................... 340/146.2; 364/900
[58] Field of Search ................... 340/146.2, 146.3 Q, 340/146.3 WD; 375/116; 371/57; 364/200, 900

[56] References Cited

U.S. PATENT DOCUMENTS

| | | | |
|---|---|---|---|
| 3,334,335 | 1/1967 | Brick et al. | 364/900 |
| 3,493,929 | 3/1970 | Webb | 340/146.2 |
| 3,849,762 | 11/1974 | Fujimoto et al. | 340/146.3 Q |
| 3,942,152 | 3/1976 | Pettersson | 340/146.2 |
| 4,016,368 | 4/1977 | Apple, Jr. | 179/15 BS |
| 4,047,153 | 9/1977 | Thirion | 340/146.3 AQ |
| 4,053,871 | 10/1977 | Vidalin et al. | 340/146.2 |
| 4,061,998 | 12/1977 | Ito | 340/146.3 AC |
| 4,100,532 | 7/1978 | Farnbach | 340/146.2 |
| 4,109,141 | 8/1978 | Sasaki | 340/146.2 |
| 4,110,737 | 8/1978 | Fahey | 340/146.3 Q |
| 4,151,511 | 4/1979 | Breikss | 340/146.2 |
| 4,192,966 | 3/1980 | Mayer | 340/146.3 WD |
| 4,246,569 | 1/1981 | Baldwin et al. | 340/146.2 |

OTHER PUBLICATIONS

R. J. Galpin, Digital Synchronizer, IBM Technical Disclosure Bulletin, vol. 15, No. 1, Jun. 1972, pp. 81-83.

Primary Examiner—Charles E. Atkinson
Attorney, Agent, or Firm—J. S. Tripoli; D. W. Phillion

[57] ABSTRACT

A system for detecting the successful detection of a known serial data sequence of L bits. The system comprises clock pulse generating means for generating a train of clock pulses at a rate $f_c$, shift register means having N stages each with an output terminal for serially receiving said data sequence at said clock pulse rate fc and for supplying the contents of each stage to the output terminal thereof, and memory means having at least M output terminals, N+M input terminals, and X memory locations each accessable by a predetermined address supplied to said input N+M terminals to supply the contents of said memory location to said M output terminals. Further provided is a latch having at least M input and output terminals and responsive to the signals on the M output terminals of said memory means to supply such signals back to the M input terminals of said memory means a time interval $\Delta$ after the entering of a bit of said serial data sequence into said shift register means, where $\Delta < 1/f_c$. The contents of said memory locations are selected to advance through a first predetermined sequence of binary patterns when addressed by a second predetermined sequence of M+N addresses; The memory means is responsive to addresses formed by said first predetermined sequences of binary patterns and the coinciding data sequence contained in said shift register means to continue outputting said first predetermined sequence of binary patterns until said serial data sequence is completely received.

3 Claims, 5 Drawing Figures

DIGITAL SEQUENCE DETECTOR

This invention relates generally to digital comparator means and more particularly, to a comparator system for detecting and recognizing, with great precision and with a relatively small amount of logic, a predetermined and expected serial sequence of bits using an addressable programmable read only memory (PROM).

Prior art devices for detecting expected sequences of binary digits or bits have generally employed an input storage means (register means) for receiving the stream of bits containing the expected sequence, a second reference storage means (register means) for containing the expected sequence, and a comparator means which compares the changing sequence in the input storage means with the contents of the reference storage means. When coincidence occurs between the contents of the input and reference storage the expected sequence is deemed to have been received. The degree of accuracy of detecting the expected sequence can range from coincidence of all the bits of the expected sequence with all of the bits of the digital signal stored in the reference register or it can be some percentage thereof.

The foregoing prior art method of digital sequence detection requires, for the detection of a 22 bit sequence, the use of 14 state-of-the-art-integrated circuit chips. The foregoing figures are provided for purposes of comparison with the present invention which, for the same function, requires only three integrated circuit chips as well be discussed later herein. It is evident that as more logic is required to perform a given function, the greater the likelihood that errors will occur, and that more power will be required.

In accordance with the preferred form of the present invention, there is provided an addressable memory means comprising X memory locations, N+M input terminals, and M output terminals, and responsive to addressing signals supplied to said N+M input terminals to supply the contents of the addressed memory location to said M output terminals. Also provided are means for supplying successive N bit segments of a received sequence of P bits to said N input terminals of said memory means every Wth received bit of said received sequence of P bits, where W is less than N. Also provided are means for supplying the signals appearing on the said M output terminals of said memory means, after an appropriate time delay for the settling of transients, back to said M input terminals of said memory means. The memory means is responsive to the said successive N bit segments and to the output signals on said M output terminals to output a predetermined sequence of binary signal patterns on said M output terminals which, when combined with such successive segments of said received sequence of P bits, will continue to address those successive memory locations of said memory means containing the successive binary signal patterns of said predetermined sequence of binary signal patterns.

Figure 1:
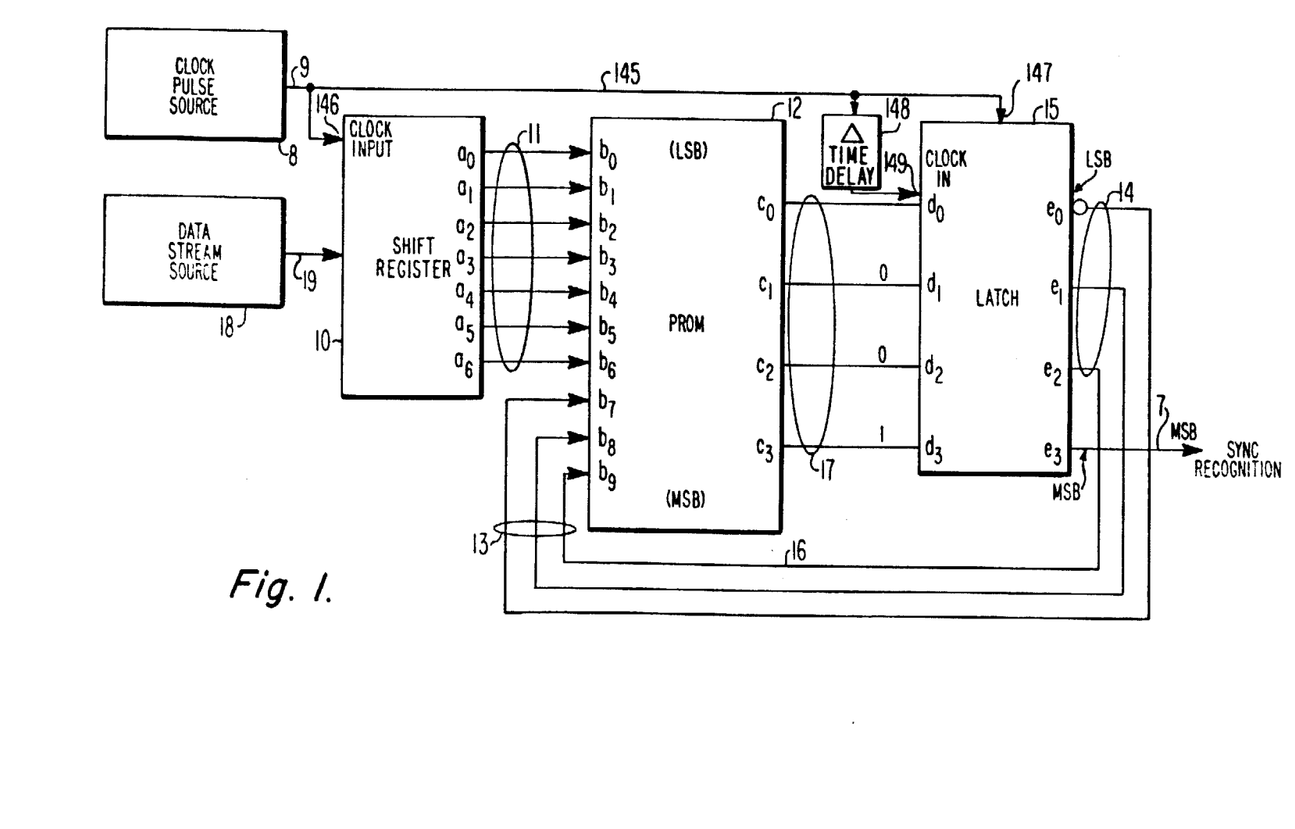
FIG. 1 is a block diagram of the implementation of the invention.

Referring now to FIG. 1, a data stream of bits is supplied serially to shift register 10 from data source 18 via lead 19 under control of clock pulses from clock pulse source 8. The shift register 10 is selected to have 7 stages with each stage having an output terminal designated generally by reference character 11 with $a_0$ representing the output terminal carrying the least significant bit and $a_6$ the output terminal carrying the most significant bit. The output terminals $a_0$–$a_6$ are connected via the seven leads 11 to the seven input terminals $b_0$–$b_6$ representing the seven least significant bit positions of a programmable read only memory (PROM) 12, which can also be a random access memory (RAM).

The PROM 12 has four output terminals $c_0$–$c_3$ upon which the contents of the addressed memory locations of PROM 12 will appear. Three of the four output terminals $c_0$–$c_3$ are connected to the input terminals $d_0$–$d_3$ of delay means or latch 15 via leads 17 and then are supplied back from the output terminals $e_0$–$e_3$ to the three input terminals $b_7$–$b_9$ representing the three most significant bit positions of PROM 12 via the three leads of 13. The function of latch 15 is primarily to isolate the output of the PROM 12 from the input terminals $b_7$–$b_9$ of PROM 12 for a period of time $\Delta$ to permit settling down of the change of addresses supplied to PROM 12. Each time the latch 15 is energized to supply its contents to the output terminals thereof, the next bit of the received sequence of bits is entered into shift register 10 to form the next input address to PROM 12 a time interval $\Delta$ after the new output from PROM 12 is clocked into latch 15.

The contents of the most significant bit position appearing on output terminal $c_3$ of PROM 12 is supplied through latch to an output lead 7 which, as will be discussed later, indicates that the expected digital sequence supplied from the data stream source 18 has been received and recognized by the logic of FIG. 1.

It can thus be seen that the memory location addressing signal of PROM 12 is a 10 bit input signal supplied to the input terminals of $b_0$–$b_9$ with the seven least significant input bits being supplied from the output terminals $a_0$–$a_6$ of shift register 10 and the three most significant bits being supplied from the three least significant output terminals $c_0$–$c_2$ of PROM 12 through latch 15 and then to the input terminals $b_7$–$b_9$ of PROM 12.

Before the first seven bits of the expected binary digital sequence are supplied into shift register 10 the output of PROM 12 is arbitrarily designated to have some value which can be, for example, the binary value 0000 with the least significant bit being at the right-hand end thereof.

In the absence of the reception of the first seven bits of the expected data sequence the output of PROM 12 will remain a binary 0000. Specifically, there are enough memory locations in PROM 12 so that unless predetermined addresses are supplied to the input terminals $b_0$–$b_9$ thereof the output of PROM 12 will be a binary 0000. The foregoing will be explained in more detail later herein.

On the other hand, if the first 7 bits of the expected binary sequence are entered into the shift register 10, then such 7 bits and the subsequent group of 7 bits formed as each subsequent bit of the expected sequence is entered into shift register 10, coupled with the 3 bits supplied from the PROM 12 and supplied back to the remaining three input terminals $b_7$–$b_9$ of PROM 12, will always function to address a memory location in PROM 12 whose contents, when combined with the 7 bits from the shift register 10, will be a binary pattern in a predetermined sequence of binary patterns, other than 0000, and will ultimately culminate in a binary pattern on output terminals $c_0$–$c_3$ of PROM 12 indicating that all bits of the expected binary sequence have been examined and that they are all correct and collectively form the expected digital sequence. The aforementioned culminating binary sequence on the output terminals $c_0$–$c_3$ of PROM 12 (and also the output terminals $e_0$–$e_3$ of latch 15) will result in a binary level on the most significant output lead 7 indicating such complete reception of the expected binary sequence.

Figures 2, 3:
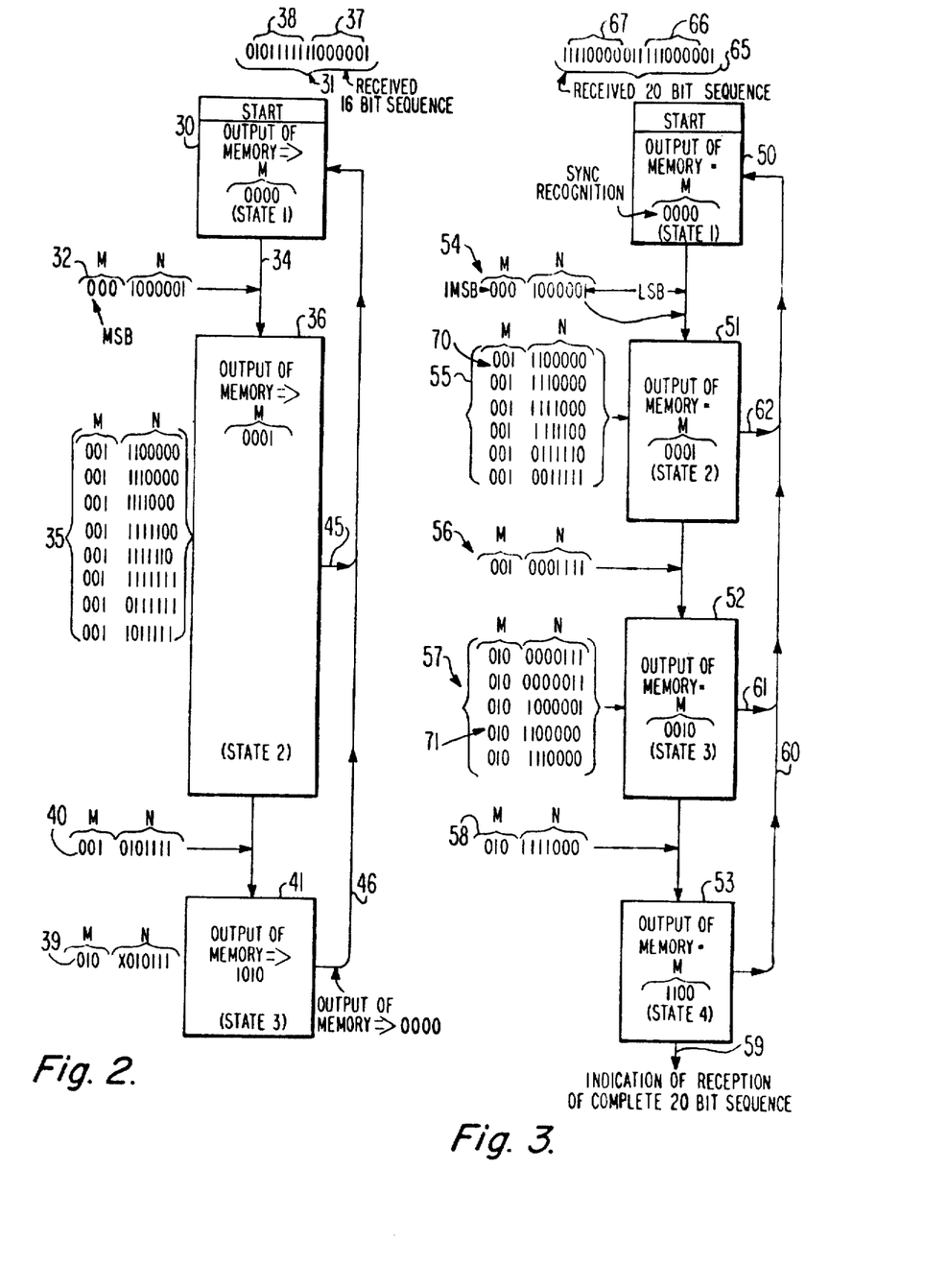
FIG. 2 is a flow chart of the operation of one form of the invention.
FIG. 3 is a flow chart of another form of the invention for receiving two binary sequences.

Referring now to FIG. 2, there is shown a functional flow chart of the operation of the structure of FIG. 1 in its most basic form. In FIG. 2 the expected received binary sequence 31 consists of 16 bits and is buried in a stream of received data bits. Before reception of such expected sequence, the 4 bit output of PROM 12 is 0000, defined herein as state 1 and as indicated in block 30, with the three least significant bits of the binary word 0000 being bracketed and labeled by the leter M to indicate that such three least significant bits are, in fact, the output of PROM 12 and form the M bits of the PROM 12. The three M input bits are specifically the three bits supplied from the output terminals $e_0$–$e_2$ of latch 15 (FIG. 1) back to the input terminals $b_7$–$b_9$ of PROM 12 via leads 13, and will represent such input three input bits throughout this specification.

When the first 7 bits 37 of the received 16 bit sequence 31, as shown in FIG. 2, are received in shift register 10 of FIG. 1 the complete 10 bit address supplied to the inputs $b_0$–$b_9$ of PROM 12 will be as shown in word 32 (FIG. 2) with the three bit M portion being derived from the output of PROM 12, as discussed above, through latch 15 and the 7 bit N portion thereof being supplied to input terminals $b_0$–$b_6$ from shift register 10.

The specific memory location of PROM 12, which is addressed by word 32, has a binary pattern 0001 stored therein as shown in block 36 and is defined herein as state 2. Such binary pattern 0001 thus appears on the output leads 17 of PROM 12 with the three least significant bits 001 thereof being designated by the letter M in block 36 and forming the three most significant bits of each of a series of words designated generally by reference character 35. These eight 10 bit words 35 are, in fact, eight successive addresses supplied to the input terminals $b_0$–$b_9$ of PROM 12. The contents of the memory locations addressed by each of the eight ten bit words 35 is the same binary pattern 0001 shown in block 36. It will be noted that the N portions of the eight binary words 35 are each determined by the addition of one more bit of the received 16 bit sequence into the shift register 10 of FIG. 1.

Thus, the N portion of the first word of the eight 10 bit words 35 is 1100000 which, as can be seen from the expected received 16 bit sequence 31, corresponds to the group of received bits 37 displaced 1 bit, which displacement is caused by the reception of one more bit of the received 16 bit sequence 31.

The N portion of the second word of the group of words 35 is a binary 1110000 which, as can be seen from the received 16 bit sequence 31, results from another bit of the 16 bit sequence 31 being received into shift register 10.

The N portion of the last word of the group of words 35 is a binary 1011111 and corresponds to the group of 7 bits 38 of the received 16 bit sequence 31, the shift register 10 having received a total of 15 bits so that the group of 7 bits 38 resides in the shift register 10.

The next and last bit received by shift register 10 will result in the last 7 bits of the received 16 bit sequence 31 residing in the shift register 10 and will produce the 10 bit word 40 shown in FIG. 2. The N portion of the word 40 is a binary word 0101111 and, as mentioned above, comprises the last 7 bits of the expected 16 bit sequence 31.

The contents of the memory location of PROM 12 addressed by address word 40 contains a binary 1010, as indicated in block 41 of FIG. 2, which is defined herein as state 3 of the operation of the system. It will be observed that the most significant bit of said binary word 1010, which is a 1, will be supplied to output lead 7 of latch 15 in FIG. 1, after a short delay, and will indicate to an appropriate utilization means, (not shown) that the expected 16 bit binary sequence has been received and positively identified bit by bit.

Thus, upon the reception of the next bit, the word 39 will be supplied to the 10 input terminals $b_0$–$b_9$ of PROM 12 of FIG. 1. The N portion of such word will be a binary X010111 where X can be either a 1 or a 0, and the M portion will be 010. The contents of the memory location addressed by word 39 will be 0000 because any memory location of PROM 12 addressed by the word containing an N portion X010111 must contain a binary 0000. The accessing of the value 0000 in memory 12 will place the system in a condition (state 1) for the reception of another expected 16 bit sequence 31.

The line 46 leading from block 41 to start block 30 indicates that the output of the memory is a binary 0000 which is defined herein as state 1. Similarly the arrow 45 leading from the state 2 block 36 to the state 1 block 30 indicates that at least one of the 8 addresses 35 has an erroneous bit therein so that the contents of the memory location accessed by the erroneous address will contain a binary 0000, thus placing the system back in the state 1 condition.

The mode of operation shown in FIG. 2 is only possible where there is no duplication of any of the N portions of those addresses having the same M portion as, for example, in the group of words 35 and the single word 40, all of which have an M portion equal to 001. If there is a duplication of one of the N portions of one of the words 35, all of which have the same M portion, then it is possible that the sequence could skip some of the words 35. For example, if there were two N portions all consisting of binary 1's and having the same M portion, then the system could skip the words in between such two binary N portions and, if the N binary segments following the N portion to which the operation skipped were the expected N segments, then the system would finish its detection of the received binary bits and indicate that a successful detection of the expected binary sequence had occurred, even though some of the words of the binary segments had been skipped.

To avoid the problems attending a duplication of N portions of the address it is necessary to add additional states, such as states of the type identified as state 1, state 2, and state 3 of FIG. 2, with duplicate N values being in different states so that the M portions thereof will be different and thus the complete 10 bit address will be different.

Reference is made to the flow chart of FIG. 3 in which there are several duplications of the N portions of the addresses. Specifically, as one example, the N portion of word 70 in the group of words 55 is the same as the N portion of word 71 in the group of words 57. By adding one more state to the mode of operation of FIG. 3, over the number employed in FIG. 2, the M portions of the words 70 and 71 can be made to be different.

In the operation of the structure of FIG. 3 the word 54 functions to move the operation from state 1, as shown in block 50 to state 2, as shown in block 51, by accessing a word location in the memory whose contents is a binary 0001, as indicated in block 51. Then all of the words 55 will have a state 2 M portion 001.

Several words before word 71 is supplied to the RAM memory the system will have moved into state 3 by the operation of word 56 which will have accessed a word location in PROM 12 containing a 0010, as indicated in block 52. Thus, all of the M portions included in the group of words 57 and also the word 58 will be 010.

Since the words 70 and 71 have different M portions, even though they have the same N portions, they will address different memory locations in PROM 12 and the contents of the different memory locations will be different in accordance with the binary patterns shown in FIG. 3. Specifically, word 70 will address a memory location whose contents are 0001 and word 71 will address a memory location whose contents are 0010.

As in the case of FIG. 2 the last word 58 of FIG. 3, if it is the correct binary sequence, will address a memory word location in PROM 12 whose contents are a binary 1100 indicating the successful reception and detection of the expected 20 bit sequence 65 shown at the top of FIG. 3.

In some systems it might be required that two binary sequences, separated by a stream of data, be received and identified. For example, in FIG. 4, it might be expected that the 16 bit binary sequence 80 will be followed by the 20 bit sequence 81, with a stream of data therebetween. Assume further that the first expected binary sequence 80 has two N portions therein which are identical, thus requiring four states 1–4 (blocks 85–88), as discussed above in connection with FIG. 2. Assume further that the second expected binary sequence 81 has two instances of duplications of the N portion of the received binary sequence which are positioned in the sequence in such a manner that system also requires four states as will be discussed in detail later. Stages 4 through 8 are designated by blocks 88, 89, 90, 91, and 92.

Figure 4:
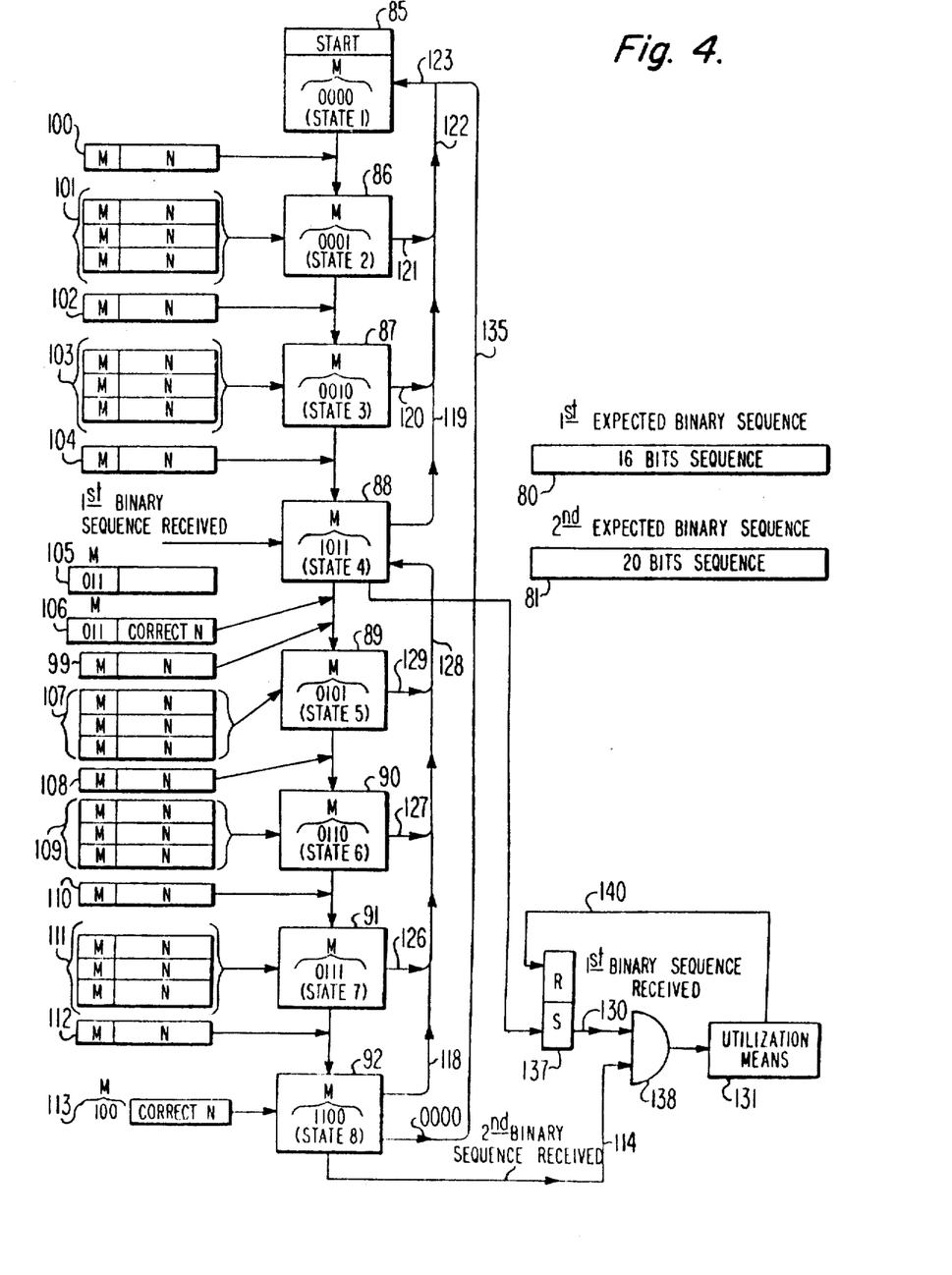
FIG. 4 is another flow chart for receiving and detecting two binary sequences employing two structures of the type shown in FIG. 1.

In general, the first binary sequence is received and the system advances from state 1 in block 85 to state 4 in block 88 where it will remain until the second 20 bit sequence 81 is received, at which time the operation will advance from state 4 (block 88) through state 8 (block 92).

Similar to the discussion re FIG. 2 the word 100 advances the detection of the received binary sequence 80 from state 1 to state 2 where the addresses 101 each access a memory locations in PROM 12 having the same M value 001. Subsequently, the word 102 advances the detection to state 3 wherein the addresses 103 access memory location whose contents are 0010.

The final word 104 in the first expected binary sequence 80 has an N value which advances the operation to state 4, as shown in block 88, which the contents of the accessed memory location is a binary pattern 1011. The most significant bit of the binary M value 1011 is a binary 1 which sets flip-flop 137 which in turn primes AND gate 138.

Since the N value has been assumed to have 7 bits there is a possibility of 128 different values of N ($2^7$) only one of which constitutes the first 7 bits of the second expected binary sequence 81 coupled with the M value 011. The remaining 127 possible N values, coupled with the 011 M value, will access memory locations in PROM 12 whose contents all contain a binary pattern 0011, thus causing the operation to remain at state 4 until the correct N value, which is the first 7 bits of binary sequence 81, is received.

It is to be understood that PROM 12 has a sufficient number of memory locations to permit the functions described herein. For example, if PROM 12 contains 1024 word locations it can readily be seen that 127 of such memory locations can be caused to have the binary pattern 0011. It is obvious that there are an ample number of additional memory locations to accommodate the words 100, 101, 102, 103, 104, and 107–113.

Upon the reception of the first correct 7 bits of the 20 bit sequence 81 the word 106 will advance the level of operation to state 5 wherein the five addresses 107 will all address memory locations whose contents are binary 0101, as shown in the state 5 (block 89). The word 108 will next advance the level of operation from state 5 (block 89) to state 6 (block 90) wherein words 109 will each access address memory locations containing a binary pattern 0110.

In a similar manner, the level of the operation will advance through state 7; and then, upon the reception of the last binary word 112, will access a memory location whose contents is a binary pattern 1100, as shown in state 8 (block 92). An indication of the successful reception of the second binary sequence 81 will then appear on output lead 114 and will, in fact, be a binary 1 in the most significant bit position (the left-hand bit) of the binary pattern 1100, as shown in block 92.

Thus, the successful reception and detection of both the first binary sequence 80 and the second binary sequence 81 are now indicated, respectively, on leads 130 and 114 which enable AND gate 138 to supply a binary 1 to a suitable utilization means 131. Such utilization means 131 can be, for example, a logic means which records the successful reception of the binary sequences 80 and 81 and thereupon initiates operation of some other logic or system (not shown). The flip-flop 137 can be reset via lead 140 in preparation for the reception of the next binary sequences 80 and 81.

Upon the successful reception of both the first and second binary sequences 80 and 81, the system reverts to the state 1 condition shown in block 85 via the operational flow line 135.

In the event of reception of an erroneous N segment during the reception of the first binary sequence 80, the level of operation will revert to state 1, as indicated by the leads 119, 120, 121, and 122, in the same manner as discussed in connection with FIG. 3. Similarly, during the reception of the expected binary sequence 81, the reception of an incorrect N segment will cause the operation level to go back to state 4 via one of the leads 118, 126, 127, 128, or 129. An erroneous address having an M value as shown in blocks 89–92 will always access a word location in memory whose contents are 1011, thus reverting the system to state 4 (block 88). It is to be understood that some of the lines appearing in FIG. 4 have signals thereon and others simply indicate the flow of operation of the system.

Alternatively in FIG. 4, the attainment of state 4, indicating that the first binary sequence 80 has been successfully received, can result in the system returning to state 1 where the output of the PROM 12 is a binary 0000. This can be accomplished by causing the contents of all of the memory locations addressed by the possible 127 words designated by reference character 105 and word 106 be a binary 0000. The first N segment of the second expected binary sequence 81 coupled with an M portion 000, as represented generally by word 99, would then advance the operation from state 1 in block 85 directly to state 5 in block 89 where M equal 101. Subsequent correctly received N segments of the second expected binary sequence 81 would then advance the operation through states 6 and 7 to state 8 in the manner generally described above.

Figure 5:
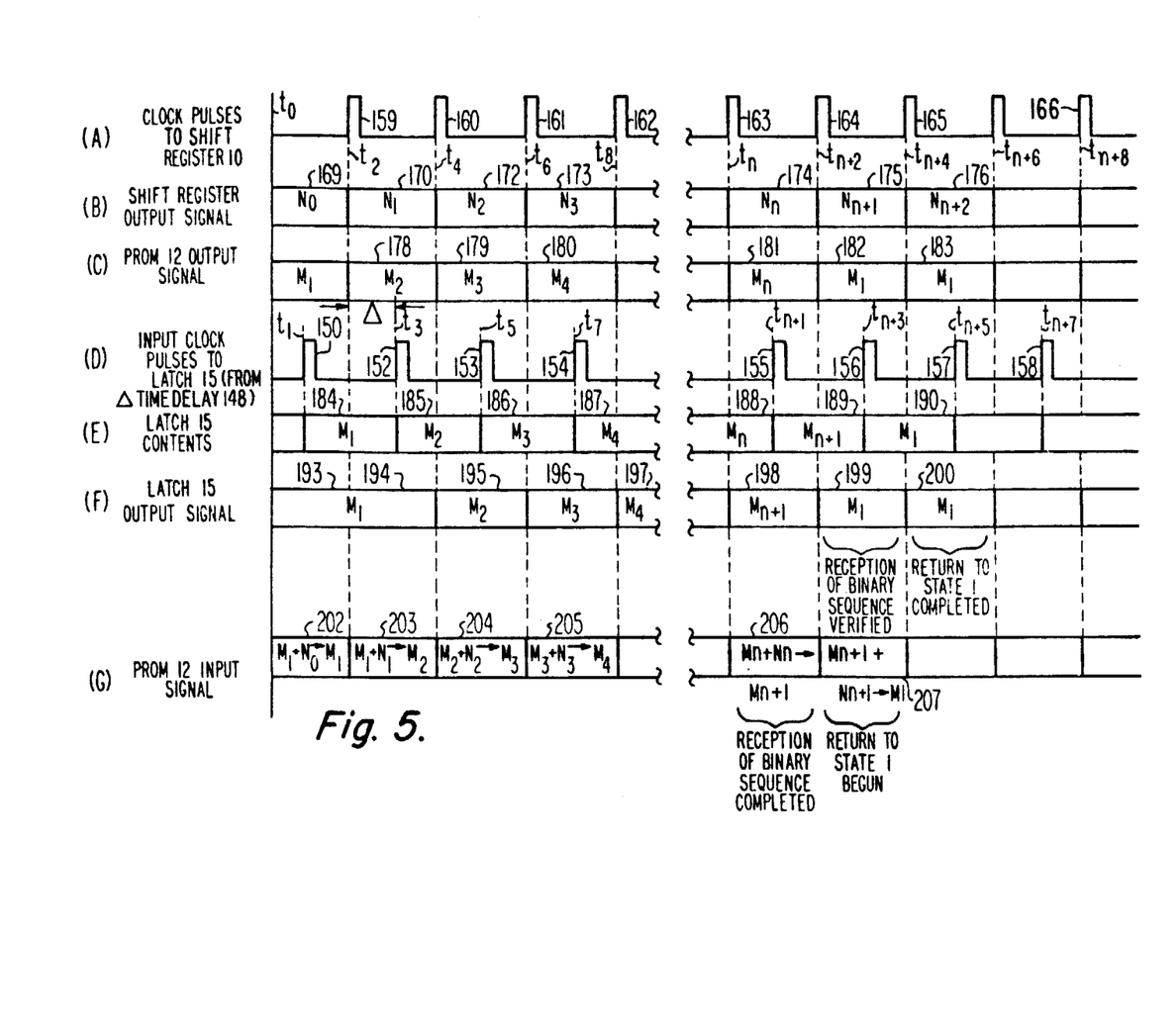
FIG. 5 is a set of timing signals to facilitate an understanding of the invention.

Suitable timing for the system is illustrated in the waveforms of FIG. 5. For purposes of convenience, the seven waveforms A, B, C,—G of FIG. 5 will be identified as waveforms 5A, 5B, 5C,—G rather than as waveform A of FIG. 5, for example.

Assume that at time $t_0$ the first 7 bits of the expected binary sequence 80 (FIG. 4) have not yet been received so that the output of PROM 12 (FIG. 2) is a binary 0000, designated as $M_1$ (segment 17) in waveform 5C. The 7 bits stored in shift register 10 are designated as $N_0$ (segment 169 of waveform 5B) and comprise a code other than any N bit segment of the expected binary sequence.

At time $t_1$, an input clock pulse 150 of waveform 5D is supplied to clock input terminal 149 of latch 15 (FIG. 1) through $\Delta$ time delay 148 to clock the $M_1$ output from PROM 12 into latch 15, as indicated in waveform 5E. At time $t_2$, a clock pulse 159 of waveform 5A is supplied to the input terminal 146 of shift register 10 to clock another bit of the expected sequence into said shift register 10 so that the output of shift register 10 is now represented as the $N_1$ segment 170 of waveform 5B. The input address to the PROM 12 will thereupon become $M_1 + N_1$ as shown in address 203 of waveform 5G, the prior address being $M_1 + N_0$ as shown in address 202 of waveform 5G.

The input address $M_1 + N_1$ to PROM 12 will produce the $M_2$ output shown in segment 178 of waveform 5C which will be clocked into latch 12 by clock pulse 152 at time $t_3$, as shown in waveform 5D and segment 185 of waveform 5E.

At time $t_4$, a clock pulse 160 supplied to the clock output terminal 147 of latch 15 will supply the $M_2$ contents of latch 15 to the output terminals $e_0-e_3$ thereof and then back to the input terminal $b_7-b_9$ of PROM 12 resulting in an input address of $M_2 + N_2$ being supplied to PROM 12 as shown in waveform 5G and identified as address 204.

The input address $M_2 + N_2$ supplied to PROM 12 will produce the $M_3$ output designated as segment 179 of waveform 5C which will be clocked into latch 15 upon the occurrence of clock pulse 153 of waveform 5D at time $t_5$. Subsequently, upon the occurrence of clock pulse 161 of waveform 5A, such $M_3$ contents of latch 15 will be clocked to the output terminals $e_0-e_3$ thereof as evidenced by segment 196 of waveform 5F. The input address to PROM 12 will then be $M_3 + N_3$ as represented by address 205 of waveform 5G. It is to be understood that upon each of the clock pulses 159-166 an additional bit of the expected binary sequence is clocked into the shift register 10 so that the N portions of the addresses 203, 204, and 205 are all different and designated respectively as $N_1, N_2, —N_{n+1}$.

The address $M_3 + N_3$ (address 205 of waveform 5G) then accesses a memory location in PROM 12 containing the M portion $M_4$ as shown in segment 180 of waveform 5C.

The value $M_3$ is clocked into the latch 15 at time $t_7$ by pulse 154 of waveform 5D and then subsequently is clocked by clock pulse 162 of waveform 5A to the output of latch 15, as represented by segment 197 of FIG. 5F. The foregoing mode of operation continues until time $t_n$ when clock pulse 163 is supplied to the system, thereby entering into shift register 10 of FIG. 1 the last N bit segment of the the expected binary sequence, identified as $N_n$ in segment 174 of waveform 5B. At time $t_{n+1}$ the value $M_n$ is gated into the latch 15 by pulse 155 of waveform 5D and subsequently gated to the output terminals of latch 15 at time $t_{n+2}$ by the clock pulse 164 of waveform 5A. Thus, at time $t_{n+2}$ the input to the PROM 12 is $M_{n+1} + N_{n+1}$ which will access a memory location containing the value $M_1$ as indicated by segment 182 of waveform 5C. The accessing of the value $M_1$, as shown in segment 182 of waveform 5C, represents the beginning of the return of the system to state 1. It is then only necessary to advance the value $M_1$ to the output of the latch 15 to complete the return to state 1. Such advancing of $M_1$ is accomplished by clock pulse 156 at time $t_{n+3}$ which enters the value $M_1$ into the latch 15, as shown in segment 190 of waveform 5E. Subsequently, the clock pulse 165 advances the value $M_1$ to the output of latch 15, as shown by segment 200 of waveform 5F.

The clock pulses 165 and 166 occurring at times $t_{n+6}$ and $t_{n+8}$ and the clock pulses 157 and 158 occurring at times $t_{n+5}$ and $t_{n+7}$ simply serve to enter into shift register 10 additional bits of the input bits being serially received, but which lie outside the expected stream of bits, and the accessing of memory locations all of which contain $M_1$ values thereby keeping the system in the state 1 condition until the next expected binary sequence is received.

What is claimed is:

1. A digital sequence detector for detecting a predetermined serial sequence of L bits and comprising:

a shift register having N stages for serially receiving said serial sequence of L bits with the reception of each additional bit constituting a new group of N bits contained in said shift register;

memory means having X memory locations, N+M input terminals, and at least M output terminals;

first means for supplying the contents of said N stages of said shift register to said N input terminals of said memory means;

second means for supplying the signals on said M output terminals of said memory means to the M input terminals of said memory means;

said second means comprising means for delaying the supplying of the signals appearing on the M output terminals of said memory means to the M input terminals thereof until the next bit of said expected sequence has been entered into said shift register means to form a next successive group of N signals;

said memory means responsive to each next successive group of N signals supplied thereto from said shift register and the delayed signals on the M output terminals of said memory means to produce a predetermined sequence of binary patterns on said M output terminals thereof as long as the predetermined sequence of L bits is being correctly received into said shift register; and means responsive to the last predetermined binary pattern supplied from said memory means to indicate the reception of the complete sequence of L binary bits received by said shift register;

said memory means being responsive to any group of N bits in said shift register which varies from any expected group of N bits to output the first binary pattern in said sequence of binary patterns.

2. A system for detecting an input signal comprising a predetermined serial sequence of L bits and comprising:

N terminals;

addressable memory means having $N+M$ input terminals and M output terminals and responsive to encoded addressing signals supplied to said $N+M$ input terminals to supply the contents of the addressed memory location to said M output terminals; and a shift register for supplying successive N bit segments of said received serial sequence of L bits to said N input terminals every Wth received bit, where $W<L$, and the contents of the addressed memory location of said memory means which appears on said M output terminals to said M input terminals;

said memory means responsive to the signals appearing on said $N+M$ input terminals to address successive memory locations in said memory means whose contents form a predetermined sequence of binary patterns as long as the L bits of the received input signal are correctly received in said serial sequence;

said memory means further responsive to a deviation of the received input signal from said predetermined serial sequence to supply a selected one of said binary patterns other than the next sequential binary pattern in said predetermined sequence of binary patterns to said M output terminals.

3. A method for detecting a predetermined expected serial sequence of L bits and comprising the steps of:

serially receiving said serial sequence of L bits with the reception of each additional W bits constituting a new group of N received bits, where W is an integer $<<N$;

providing a memory means having X memory locations, $N+M$ input terminals, and at least M output terminals;

means for delaying the output binary signal patterns appearing on the M output terminals of said memory means until the next bit of said expected serial sequence has been received to form the next successive group of N signals;

supplying each next successive group of N received bits to said N input terminals of said memory means and the delayed signals on said M output terminals of said memory means to the M input terminals of said memory means;

producing a predetermined sequence of binary patterns on the M output terminals of said memory means as long as the predetermined sequence of L bits is being received;

determining the reception of the complete expected serial sequence of L binary bits by the supplying of a first unique binary pattern from said memory means; and determining a deviation of the sequence of binary patterns from said predetermined sequence of binary patterns by causing said memory means to output a predetermined binary pattern in response to said deviation in preparation of the reception of the next predetermined sequence of binary patterns.

* * * * *

UNITED STATES PATENT AND TRADEMARK OFFICE
CERTIFICATE OF CORRECTION

PATENT NO. : 4,404,542

DATED : September 13, 1983

INVENTOR(S) : Caleb H. Thomas, Jr.

It is certified that error appears in the above-identified patent and that said Letters Patent is hereby corrected as shown below:

Column 1, line 32, "well" should be --will--.

Column 6, line 3, "which" should be --wherein--.

Signed and Sealed this

Twentieth Day of December 1983

[SEAL]

Attest:

GERALD J. MOSSINGHOFF

Attesting Officer

Commissioner of Patents and Trademarks